UNITED STATES PATENT OFFICE.

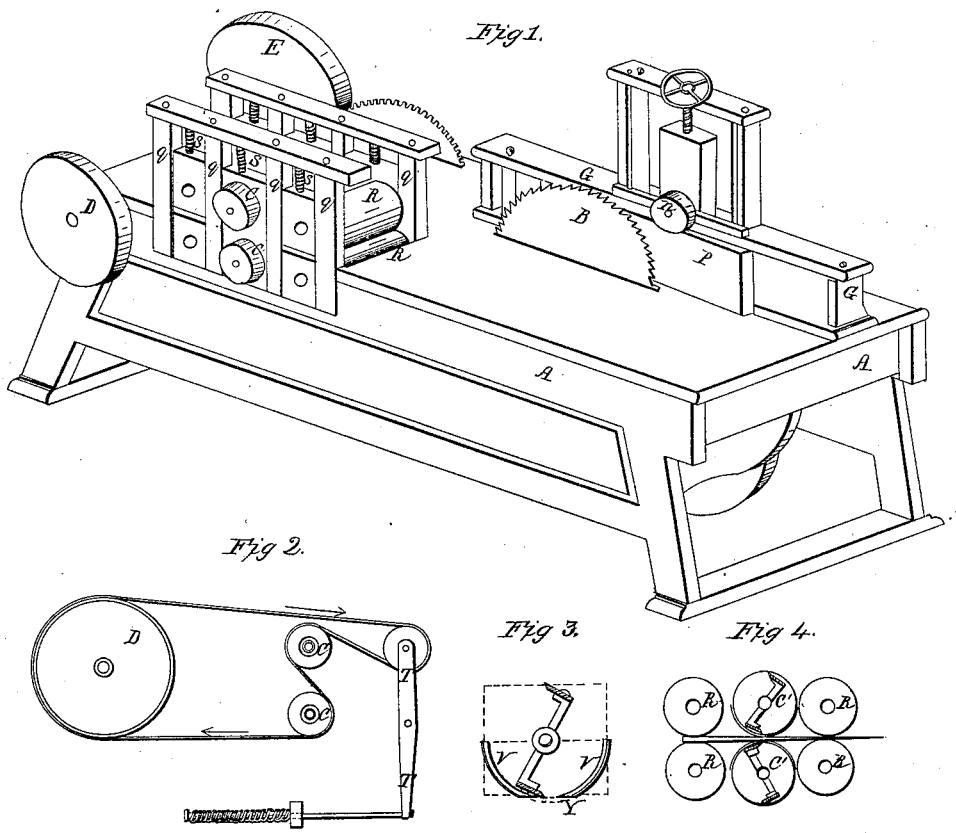

WILLIAM HUEY, OF COLUMBIA, PENNSYLVANIA.

SHINGLE-MACHINE.

Specification of Letters Patent No. 16,546, dated February 3, 1857.

*To all whom it may concern:*

Be it known that I, WILLIAM HUEY, of Columbia, in the county of Lancaster and State of Pennsylvania, have invented a new and useful Improvement in Machines for Making Shingles; and I hereby declare the following to be a true and correct description thereof, reference being had to the drawings herewith presented, which drawings constitute a part of said description.

The nature of my invention consists in combining the circular sawing machine with a planer of a particular kind in such manner and position as to operate automatically in planing both sides of each shingle as they fall from the saw.

To enable others to make and use my improvement I describe the construction and manner of using the same as follows viz:

Figure 1 is a view of the machine having the roller belt and tightener removed in order to see the position of the rollers which feed the planer and remove the finished work. A A is the frame or table in which the saw B is mounted in the usual way, and has a movable frame G with the pattern P. This is a mold or sort of wedge-shaped slide so fitted as to be shoved along with the block from which the shingles are to be sawed and at the same time governs the taper of the shingle. This mold or pattern is furnished with a line and weighted pulley to bring back the pattern at each return of the block, and it is also furnished with a roller n, fixed on the movable block I, which is pressed down by a screw in the frame (H H). In using this part of the apparatus the operator takes the block and pressing it gently against the pattern P, he shoves it along by the saw; then reversing the block saws the next shingle the opposite end foremost so that each shingle is sawed butt foremost and as the shingle falls down upon the table it is caught by the rollers (r r) and carried forward where it comes in contact with the planers which are two revolving cylinders having plane irons set to take a fine shaving both at top and under side of the shingle or clapboard as the case may be. The planers are mounted in the frame (g g g) in such a manner as to be movable apart and to open by the butt end of the shingle as it is being pushed in by the first pair of rolls the upper cylinder is raised so as only to take a thin shaving from the upper surface while the lower cylinder is taking a thin shaving also from the under side. Now the rollers are weighted with spiral springs (S, S, S) as well as the planing cylinder and as the shingle passes through both roller and planer follow down according to the taper of the shingle, taking the same thickness of shaving from the thin part as from the thick part thereof. The rollers are geared to revolve alike with slow motion while the planers are belted and turned by their pulleys (C C).

The plan of belting and tightening may be seen at Fig. (2) where the belt from the wheel (D) passes over the tightener (T T,). This is a lever with fulcrum in the middle having a pulley at top and spring at the bottom to give the belt sufficient tension. The planing cylinders revolving in direction contrary to that of the rollers so that the cutting is from the butt toward the top or thin end and not against the grain.

Fig. 3 is a section of the cylinder case a little magnified with its cutters (or knives shaded red) and shows an opening at Y, where the circumference is intersected by a plane cut parallel to the tangent, allowing the knife to project beyond the bottom of the case to cut a shaving.

It may be remarked that when the shingle enters as seen at Fig. 4 the upper rolls and upper cylinder-case are raised by the thickness of the shingle, and the case (v, v,) is firmly attached to the blocks (or boxes) that support the journals of the planer, and the knives being accurately adjusted, are raised or depressed and continue to cut a chip of equal thickness, whatever may be the thickness of the shingle (or board).

Similar letters denote corresponding parts in each section.

In locating the saw and planer regard should be had to the length of shingles to be made, so that when one shingle falls on the table the next shingle in being sawed pushes it along between the rolls. Other parts of the machine are common and need not be particularly described here.

What I claim and desire to secure by Letters Patent is—

1. The particular method of adjusting the knives within the cylindrical (or other shaped) case that they may be made to rise and fall according to the thickness of the shingle (or board).

2. I claim attaching the sawing and planing machine in such juxtaposition as to operate automatically as above described, in manner, and for the purpose set forth.

In testimony whereof I hereto subscribe in presence of two witnesses.

WILLIAM HUEY.

Witnesses:
A. S. BRUNER,
DAVIS E. BRUNER.